United States Patent [19]

Johnson et al.

[11] 4,237,023
[45] Dec. 2, 1980

[54] AQUEOUS HEAT-STORAGE COMPOSITIONS CONTAINING FUMED SILICON DIOXIDE AND HAVING PROLONGED HEAT-STORAGE EFFICIENCIES

[75] Inventors: Timothy E. Johnson, Newton Center, Mass.; John Giuffrida, Annandale, N.J.

[73] Assignees: Massachusetts Institute of Technology, Cambridge; Cabot Corporation, Boston, both of Mass.

[21] Appl. No.: 22,232

[22] Filed: Mar. 20, 1979

Related U.S. Application Data

[63] Continuation-in-part of Ser. No. 961,161, Nov. 16, 1978, abandoned.

[51] Int. Cl.$^3$ .............................................. C09K 5/06
[52] U.S. Cl. ...................................... 252/70; 126/400
[58] Field of Search .......................... 252/70; 126/400

[56] References Cited

U.S. PATENT DOCUMENTS

| 2,803,115 | 8/1957 | Shepherd | 252/70 X |
| 3,720,198 | 3/1973 | Laing et al. | 126/400 |
| 3,986,969 | 10/1976 | Telkes | 252/70 |

OTHER PUBLICATIONS

Johnson, "Lightweight Thermal Storage for Solar-Heated Buildings"; *Solar Energy*, 19, pp. 669–675, (1977).
"Chemical Mixture Creates 'Midnight Sun'", *Chemical Week*, Mar. 1, 1978, pp. 34–35.
Telkes, "Storage of Solar Heating/Cooling", Ashrae Trans., vol. 80, Part II, (1974).

*Primary Examiner*—Harris A. Pitlick
*Attorney, Agent, or Firm*—Arthur A. Smith, Jr.; David E. Brook

[57] ABSTRACT

Aqueous heat-storage compositions useful in space heating applications are disclosed which contain a phase-change material which absorbs and stores heat as it is heated above its phase-change temperature and releases stored heat as it is cooled below its phase-change temperature. These compositions include fumed silicon dioxide which acts as a stabilizing agent and provides dramatically prolonged heat-storage efficiency for these compositions as they undergo repetitive cycling through their phase-change temperature. Articles containing such compositions and methods of forming such compositions are additionally disclosed.

21 Claims, 2 Drawing Figures

AQUEOUS HEAT-STORAGE COMPOSITIONS CONTAINING FUMED SILICON DIOXIDE AND HAVING PROLONGED HEAT-STORAGE EFFICIENCIES

GOVERNMENT SUPPORT

The invention described herein was partially made during the course of work supported by an NSF Grant.

RELATED APPLICATIONS

This is a continuation-in-part of Ser. No. 961,161, filed Nov. 16, 1978, now abandoned.

BACKGROUND OF THE INVENTION

1. Field of the Invention

This invention is in the field of energy and more particularly relates to aqueous heat-storage compositions suitable for absorbing and storing energy as they are heated above a predetermined temperature and subsequently releasing heat energy as they are cooled below the predetermined temperature.

2. Description of the Prior Art

Phase-change materials that absorb and release heat latently when they are cycled above and below a given temperature have been attractive candidates for thermal storage because of the great quantities of heat that can be stored in a relatively small volume of material. Although there is a large number of materials which are suitable, based upon their latent heats of fusion and melting points, the overwhelming majority of such materials fail to meet other stringent physical and chemical requirements necessary for practical systems.

Organic materials, for example, have a tendency to deteriorate over relatively short periods of time and are also susceptible to growth of microorganisms. Additionally, many inorganic and organic materials are too expensive to be practical, have unacceptable coefficients of thermal expansion, toxicities or other physical or chemical properties.

Of all the possible materials, inorganic salt hydrates have proven to have the best balance of properties to date. Unfortunately, such inorganic salt hydrates often lose their heat-storage efficiency as the materials are repeatedly thermally cycled. Often, such loss of heat-storage efficiency is associated with incongruent melting of components which produces phase separation in these materials after an insufficient number of thermal cyclings.

Several attempts to overcome phase separation after repeated thermal cycling due to incongruous melting of inorganic salt hydrates are described in the patent literature.

Laing et al., in U.S. Pat. No. 3,720,198, for example, describe shape-retaining bodies which may be in the form of a sponge, foam, or zeolite-type structure, which bodies are insoluble or substantially insoluble in melted storage material at the operating temperature and which have a plurality of capillary passages. Such shape-retaining bodies retain molten heat-storage materials by capillary forces. Zeolite-type structures which retain their shape are formed by intimately mixing a heat-storage material, body-forming material and seed crystal; heating the mixture to a temperature where the body-forming material is 30% soluble; and cooling to form a solid shape-retaining body. Inorganic salt hydrates, including the decahydrate of sodium sulfate or the dodecahydrate of disodium hydrogen phosphate, are disclosed as suitable heat-storage materials. Particularly suitable substances for producing the body are stated to be those which have a fibrous crystal structure. These include fibrous or flocculent silicates, such as aerosil (fumed silicon dioxide), tripotassium or dipotassium silicate, calcium aluminates, the ferrites of the light metals, flocculent soot, magnesium oxide, silicon oxide and other flocculent crystals of other oxides or salts.

Telkes, in U.S. Pat. No. 3,986,969, discloses aqueous dispersions of heat-of-fusion materials, including sodium sulfate decahydrate and eutectics thereof, with a nucleating agent, such as borax, and a homogenizing agent comprising clay-type substances made up of particles that are lath-like in appearance. Telkes' preferred homogenizing or thickening agents are attapulgus-type clays, particularly the attapulgite-type clay sold under the trademark "Min-U-Gel 200" by the Floridin Company, Berkley Springs, West Virginia. These attapulgite-type clays are stated by Telkes to provide increased stability compared to previously used thickening agents, including wood shavings, wood pulp, sawdust, various types of cellulosic mixtures, or METHOCELL thickeners, starch, organic alginates, silica gel, diatomaceous earth, and other finely divided silica products.

Despite the improved stability achieved by Telkes' heat-storage compositions, these compositions still do not have sufficient retention of heat-storage efficiencies to make them practical, and these Telkes' compositions still do undergo phase separation after an insufficient number of thermal cyclings through their phase-change temperature.

SUMMARY OF THE INVENTION

The invention relates to aqueous heat-storage compositions containing a phase-change material which absorbs and stores heat as it is heated above its phase-change temperature and releases stored heat as it is cooled below its phase-change temperature. More specifically, the invention is based upon the surprising discovery that the addition of fumed silicon dioxide to such compositions provides a dramatic increase in the period of retention of heat-storage efficiency and physical stability of such compositions as they are repeatedly cycled through their phase-change temperature. These compositions retain their heat-storage efficiency over a greater number of thermal cyclings than has heretofore been possible with prior compositions.

Thus, compositions adapted to reversibly store heat energy as their temperature is raised above a predetermined temperature and to release stored energy as their temperature is lowered below the predetermined temperature are provided. These aqueous compositions comprise a phase-change material and fumed silicon dioxide.

The compositions of this invention have the recognized advantages of heat-storage compositions employing latent heat-of-fusion materials, and, in addition, have dramatically prolonged heat-storage efficiency and stability against phase separation as they are repeatedly cycled through their phase-change temperature. This increased stability makes such compositions practical for use in heat-storage articles useful in the building and construction industries, etc., where it is desirable to provide all or a part of the heating requirements by repetitive storage and release of heat, particularly heat obtained from solar energy. The compositions are also useful, of course, in cooling applications as well as in heating applications.

DESCRIPTION OF PREFERRED EMBODIMENTS

Figure 1:
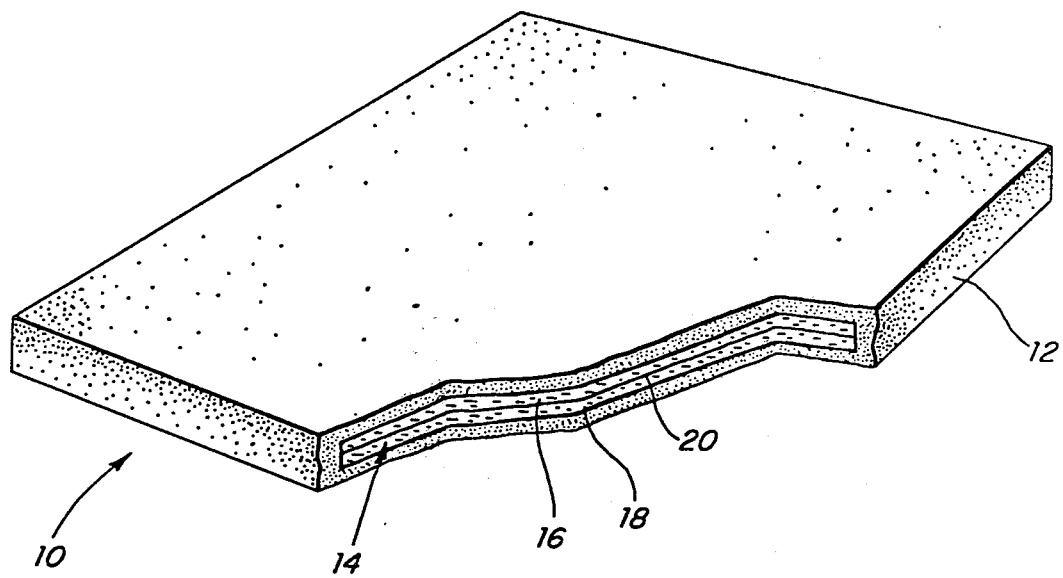
FIG. 1 is a cut-away perspective view of a solar ceiling tile containing a heat-storage composition according to this invention; and, FIG. 2 is a graphical presentation of the cooling behavior of a composition according to this invention.

A wide variety of phase-change materials can be used with this invention. Preferred materials are inorganic salts capable of forming salt hydrates in the presence of water and which have theoretical heats-of-fusion of at least about 80 BTU/lb. Examples include calcium chloride (hexahydrate), sodium carbonate (decahydrate), disodium phosphate (dodecahydrate), calcium nitrate (tetrahydrate), sodium thiosulfate (pentahydrate) and sodium sulfate (decahydrate).

A particularly preferred heat-of-fusion material is sodium sulfate because it is relatively inexpensive, commercially available in large quantities, and has a phase-change temperature of about 88° F. This phase-change temperature can be readily adjusted downwardly by use of a temperature depressing salt.

Phase-change temperature depressing materials are materials which form eutectic mixtures with phase-change materials. Inorganic salts are commonly employed with inorganic phase-change salts such as those described above. Examples include alkali metal halides, including sodium chloride.

These aqueous heat-storage compositions also optionally include nucleating agents to minimize super cooling below the phase-change temperature and to thereby foster crystallization at the phase-change temperature. Examples of specific compounds which are suitable as nucleating agents are the inorganic alkali metal borates, such as sodium borate.

All compositions of this invention contain fumed silicon dioxide as a stabilizing agent. Surprisingly, fumed silicon dioxide provides these compositions with dramatically prolonged heat-storage efficiency and increased stability against phase separation as they are repetitively cycled through their phase-change temperature.

An example of suitable fumed silicon dioxide is the proprietary material sold under the registered trademark "CAB-O-SIL" by Cabot Corporation, Boston, Mass. CAB-O-SIL fumed silicon dioxide has unique properties, including extremely small particle size, high surface area, high purity and chain-forming tendencies.

Preferred fumed silicon dioxide is that which is pyrogenically produced by hydrolysis of silicon halides, particularly silicon tetrachloride, in a high temperature flame. Details relating to the preparation of such fumed silicon dioxide are described in U.S. Pat. Nos. 2,876,119; 2,990,249; 3,954,945; 4,048,290.

Other fumed silicon dioxices are suitable including those manufactured by the plasma process involving high temperature oxidation of silicon monoxide vapors which are generated by thermal plasma heating and disassociation of a suitable silicon-containing feed stock. Manufacture of such plasma silicas is described in U.S. Pat. Nos. 2,863,738; 3,423,184; and 3,642,453.

One technique for preparing the aqueous heat-storage compositions described herein comprises a two step method. In the first step, fumed silicon dioxide is added to water maintained at an elevated temperature, such as above about 100° F. This addition is made under high shear mixing conditions to form a stable, high-solids, low-viscosity predispersion of fumed silicon dioxide. Subsequently, the phase-change material, in its anhydrous form, and any other ingredients, are added to the predispersion at elevated temperatures, such as above 100° F. These latter materials are added under low speed mixing conditions to form a uniform aqueous dispersion.

The amount of water incorporated into these compositions is chosen to completely satisfy, but not be in substantial excess of, the hydration requirements of the anhydrous phase-change salt. For example, if the anhydrous phase-change salt is sodium sulfate, the amount of water employed is that calculated to be sufficient to allow the quantity of sodium sulfate employed to crystallize as sodium sulfate decahydrate (Glauber's salt) as the temperature of the composition is lowered below its phase-change temperature.

The quantity of fumed silicon dioxide desired can then be determined. The quantity of fumed silicon dioxide present in the final composition will be affected by: (1) the quantity of fumed silicon dioxide predispersion employed to make up the completed composition; and (2) the concentration of fumed silicon dioxide in this predispersion. Thus, sufficient fumed silicon dioxide is added to the predispersion to yield a finished composition having the desired concentration. The exact amount of fumed silicon dioxide selected will depend upon many variables, including the amounts and types of other ingredients present. However, in general, amounts of fumed silicon dioxide of from about 0.5% to about 5%, by weight of the total composition, are suitable.

If a temperature depressing salt is added, the amount employed will depend upon the desired phase-change temperature of the eutectic mixture. In other words, sufficient temperature depressing salt is added to provide a eutectic mixture having the preselected phase-change temperature.

Similarly, nucleating agents are added in an effective amount to promote recrystallization at the phase-change temperature and to avoid supercooling below this temperature.

A particularly preferred composition has been found to be one containing the following ingredients, based upon 100%, by weight:

anhydrous sodium sulfate—37.9%
sodium chloride—7.8%
sodium borate—2.6%
fumed silicon dioxide—3.4%
water—48.3%.

Additionally, it is believed that small variations of these percentages of ingredients, or substitution of relatively equivalent temperature depressants and/or nucleating agents, would not significantly change the properties of this particularly preferred composition.

One use for the compositions of this invention is in building and construction materials such as solar ceiling tile 10 illustrated in FIG. 1. Solar ceiling tile 10 has a hollow slab shell 12 formed from a material which is rigid, waterproof and thermally conducting. One suitable material is polyester concrete containing approximately 15% polyester resin and 85% aggregate, and having a water vapor-impermeable membrane as an inner liner. The water vapor-impermeable membrane can be formed from 2-mil thick aluminum foil coated on both sides with a 2-mil layer of low density polyethylene. A core volume 14 is provided within hollow slab 12 and, as shown, contains two cells 16, 18, each containing aqueous heat-storage composition. Cells 16 and 18 are separated by a water vapor-impermeable membrane 20. Each cell has a thickness of about ⅜ inch. Other rigid shields having one or more core volumes therein could be employed, of course.

It has been found preferable to limit the thickness of heat-storage compositions, such as that within each of cells 16 and 18 of core volume 14. In general, the thickness is limited to a value which allows recrystallization of the phase-change material to occur primarily by diffusion. For a system employing anhydrous sodium sulfate as the heat-of-fusion salt, this has been found to be a maximum thickness of about one cm.

Compositions described herein can be packaged in a wide variety of containers. One suitable container is a flexible pouch formed from a polymeric material which is impermeable to water vapor. A specific example of a polymeric material is a film laminate of 2 mils polyethylene/0.7 mils aluminum/0.5 mils polyester; this laminate is a preferred material because it is resilient, tough and has good heat conduction properties in addition to having outstanding resistance to water vapor transmission.

Flexible pouches containing compositions of this invention can be inserted directly into a core volume of a rigid shell, such as the ones formed within tile 10 of FIG. 1, without the requirement for a separate membrane liner. Such pouches can also be utilized in other ways, such as by simply laying them up on a rigid slab, such as a concrete ceiling, or by supporting them on an open frame. Those skilled in the art will know other ways for utilizing such pouches, or will be able to determine such additional uses by employing routine experimentation.

This invention can be further specifically illustrated by the following examples.

EXAMPLE 1

A dispersion of 3.4 parts by weight of CAB-O-SIL M-5 fumed silicon dioxide and 48.3 parts by weight of water was prepared under high shear mixing in a Waring blender.

The following dry ingredients, laboratory grade, were hand mixed:

|  | Parts by Weight |
| --- | --- |
| anhydrous sodium sulfate | 37.9 |
| sodium chloride | 7.8 |
| sodium borate | 2.6 |

Subsequently, the dry mixture was folded into the aqueous dispersion with hand mixing.

Accelerated thermal aging tests were conducted on a small sample of this heat-storage composition by sealing 12 ml. of the composition in a screw-top, glass vial that varied in diameter from 1.2 to 0.3 cm. Since some water could escape through the rigid plastic screw-top, the vial was sealed inside a transparent Mason jar to prevent further escape of water. The jar was heated with an IR lamp for two hours, and allowed to air cool in a 15° C. (62° F.) atmosphere for four hours. After 3000 cycles, no syneresis was visibly detectable and the heat content remained at 33 BTU/lb.

Figure 2:
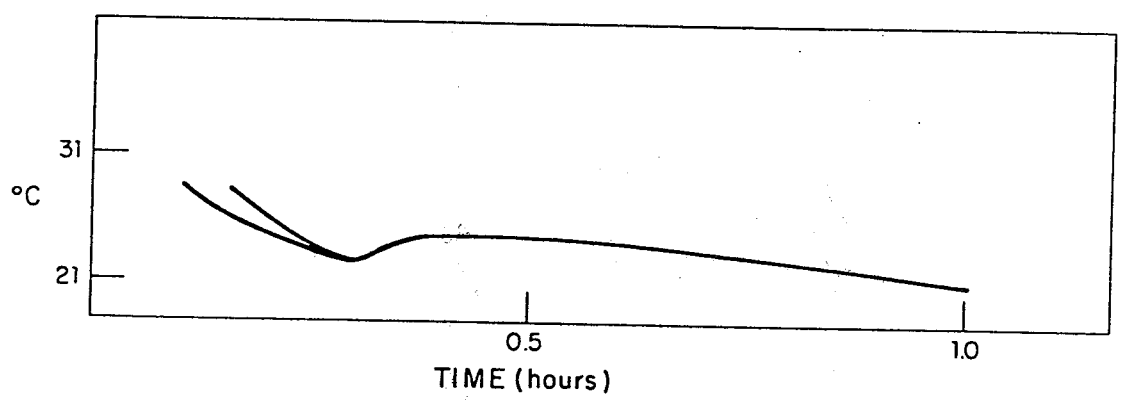

FIG. 2 shows the freezing behavior of this composition at the 266th cycle and at the 500th cycle, as measured by a thermistor buried in the center of the material. As can be seen, the cooling curves are essentially coincident indicating nearly the same heat release characteristics during each test.

EXAMPLE 2

Three thousand pounds of a 10%, by weight, aqueous predispersion of fumed silicon dioxide was formed by slowly adding 300 lbs. of CAB-O-SIL ® M-5 fumed silicon dioxide to 2700 lbs. of dionized water maintained at 160° F. under high shear mixing conditions. The high shear mixing was provided by employing a Daymax Model 660 mixer.

Subsequently, 17.45 pounds of this aqueous predispersion was added to a dispersion tank. 7.66 pounds of hot water (>100° F.) was added while a Myers Engineering dual shaft mixer was operated at about 25 rpm. 18.41 pounds of sodium sulfate was added slowly, followed by 1.25 pounds of borax and 3.77 pounds of sodium chloride. The dry ingredients were industrial grade and the rate of addition of the dry ingredients was controlled to maintain the mass in a fluid state. Vigorous agitation was provided by the mixer, which combined the features of an anchor and pitch-blade turbine to remove collected materials from the walls of the container and to fold and disperse these into the agitating mass within the container.

The resulting composition was a gel-like mixture that flowed under shear forces, such as are imposed by pumping. The heat content of this composition was measured in a calorimeter after 50 cycles and found to be 33 BTU/lb.

Accelerated thermal aging tests were conducted according to the procedures of Example 1, and after 1500 cycles no syneresis was visibly detectable and the heat content remained at 33 BTU/lb.

EXAMPLE 3

For purposes of comparison to the compositions of Examples 1 and 2, three alternate compositions were prepared. These samples were prepared by mixing the following ingredients in the percentages given:

| Ingredients | Weight % |
| --- | --- |
| Hot tap water | 45.5% |
| Thixotrope | 3.0% |
| Borax | 2.6% |
| Sodium sulfate | 38.1% |
| Sodium chloride | 7.8% |

Each of these compositions was tested as described in Example 1 and the following data were found:

| Sample | Thixotrope | Thermal Cycles | Appearance |
| --- | --- | --- | --- |
| A | SANTOCEL Z Silica Aerogel | 454 | no visible separation |
| B | MIN-U-GEL 200 Colloidal Attapulgite | 454 | Fully separated |
| C | SYLOID 72 Silica. | 454 | Fully separated |

EXAMPLE 4

A further comparative composition was prepared according to the example in Telkes, U.S. Pat. No. 3,986,969. Thus, the following ingredients were mixed in the weight percentages given:

| | |
|---|---|
| Hot tap water | 49% |
| MIN-U-GEL 200 Colloidal Attapulgite | 9.4% |
| Borax | 2.6% |
| Sodium sulfate | 38.7%. |

This comparative composition was tested according to the procedures of Example 1. Its initial heat content was 43 BTU/lb. After 100 thermal cycles, a small amount of syneresis was visually detectable. At 454 cycles, 4% of the material had separated as free solution and 4% of the material was composed of an anhydrous plug of sodium sulfate. The heat content after 454 cycles was 24 BTU/lb.

It will be understood that various other changes in the details, materials, steps, and arrangements of parts which have been described and illustrated in order to explain the nature of the invention will occur to and may be made by those skilled in the art upon a reading of this disclosure and such changes are intended to be included within the principles and scope of this invention which is limited only by the claims attached hereto.

What is claimed is:

1. In an aqueous heat-storage composition containing a phase-change material which absorbs and stores heat as it is heated above its phase-change temperature and releases stored heat as it is cooled below its phase-change temperature and a stabilizing agent to prolong heat-storage efficiency as the composition is repeatedly cycled through its phase-change temperature:
   the improvement wherein said stabilizing agent comprises fumed silicon dioxide uniformly dispersed throughout said composition in a stable dispersion thereof.

2. The improvement of claim 1 wherein said fumed silicon dioxide was pyrogenically prepared by hydrolysis of a silicon halide feedstock.

3. An aqueous composition adapted to reversibly store heat energy as its temperature is raised above a predetermined temperature and to release stored heat energy as it is cooled below said predetermined temperature, comprising a uniform and stable dispersion of:
   an inorganic salt capable of forming a salt hydrate in said aqueous composition and having a theoretical heat-of-fusion at its phase temperature of at least about 80 BTU/lb.;
   a quantity of water sufficient to supply the hydration requirements of said inorganic salt in its hydrated form; and,
   fumed silicon dioxide present in an effective amount to significantly prolong the heat-storage efficiency of said composition as it is repetitively thermally cycled through its phase-change temperature.

4. An aqueous composition of claim 3 wherein said fumed silicon dioxide was pyrogenically prepared by hydrolysis of a silicon halide feedstock.

5. An aqueous composition of claim 4 additionally including an inorganic recrystallization temperature depressing salt which forms a eutectic mixture with said inorganic salt, said eutectic mixture having a phase-change temperature corresponding to said predetermined temperature.

6. An aqueous composition of claim 5 additionally including a nucleating agent to promote recrystallization and inhibit supercooling of said inorganic salt as said composition is cooled below its phase-change temperature.

7. An aqueous composition of claim 6 wherein said inorganic salt comprises sodium sulfate.

8. An aqueous composition of claim 7 wherein said recrystallization temperature depressing salt comprises an alkali metal halide.

9. An aqueous composition of claim 8 wherein said nucleating agent comprises an alkali metal borate.

10. An aqueous composition of claim 9 wherein said alkali metal borate is sodium borate.

11. An aqueous composition of claim 10 wherein said alkali metal halide is sodium chloride.

12. An aqueous dispersion consisting essentially of, by weight:
    about 37.9%—anhydrous sodium sulfate
    about 7.8%—sodium chloride
    about 2.6%—sodium borate
    about 3.4%—fumed silicon dioxide
    about 48.3%—water.

13. A heat-storage article comprising a water vapor-impermeable, thermally conducting container and an aqueous composition adapted to reversibly store heat energy as its temperature is raised above a predetermined temperature and to release stored heat energy as it is cooled below said predetermined temperature, said composition containing an inorganic salt capable of forming a salt hydrate in said aqueous composition and having a theoretical heat-of-fusion at its phase temperature of at least about 80 BTU/lb.; a quantity of water sufficient to supply the hydration requirements of said inorganic salt in its hydrated form; and, fumed silicon dioxide present in an effective amount to significantly prolong the heat-storage efficiency of said composition as it is repetitively thermally cycled through its phase-change temperature.

14. A heat-storage article of claim 13 wherein the thickness of said aqueous composition within said container is limited to a thickness which allows recrystallization of the phase-change material to occur primarily by diffusion.

15. A heat storage article of claim 14 wherein said container comprises a flexible resilient pouch.

16. A heat-storage article of claim 14 wherein said container comprises a rigid shell forming a core volume therein.

17. A heat-storage article of claims 15 or 16 wherein said inorganic salt is anhydrous sodium sulfate.

18. A heat-storage article of claim 17 wherein the maximum thickness of said core volume is about one centimeter.

19. A method of forming a heat-storage composition comprising an inorganic heat-of-fusion salt having fumed silicon dioxide homogeneously dispersed therein, comprising:
    a. adding fumed silicon dioxide to water maintained at an elevated temperature under high shear mixing conditions to thereby form a stable, high-solids, low-viscosity aqueous predispersion of fumed silicon dioxide; and,
    b. adding said inorganic heat-of-fusion salt into said predispersion at an elevated temperature and under low speed mixing conditions to thereby form said homogeneous dispersion of inorganic heat-of-fusion salt and fumed silicon dioxide.

20. A method of claim 19 wherein said inorganic heat-of-fusion salt comprises anhydrous sodium sulfate.

21. A heat-storage composition formed by the method of claim 20.

* * * * *